US008738517B2

(12) United States Patent
Bedier et al.

(10) Patent No.: US 8,738,517 B2
(45) Date of Patent: May 27, 2014

(54) AUTHENTICATION DATA-ENABLED TRANSFERS

(75) Inventors: Osama Mostafa Bedier, San Jose, CA (US); Ray Hideki Tanaka, San Jose, CA (US); Henry H. Pham, Palo Alto, CA (US); Aaron M. Lee, San Francisco, CA (US); J. Paul Janney, Cheyenne, WY (US); Nida K. Zada, San Jose, CA (US)

(73) Assignee: eBay, Inc., San Jose, CA (US)

( * ) Notice: Subject to any disclaimer, the term of this patent is extended or adjusted under 35 U.S.C. 154(b) by 61 days.

(21) Appl. No.: 11/618,700

(22) Filed: Dec. 29, 2006

(65) Prior Publication Data

US 2008/0162366 A1 Jul. 3, 2008

(51) Int. Cl.
*G06Q 40/00* (2012.01)

(52) U.S. Cl.
USPC .............................................. 705/39; 705/40

(58) Field of Classification Search
USPC ........................................................ 705/39
See application file for complete search history.

(56) References Cited

U.S. PATENT DOCUMENTS

| | | | |
|---|---|---|---|
| 4,273,362 A | 6/1981 | Carrier et al. | |
| 4,643,454 A | 2/1987 | Ondis | |
| 5,649,118 A | 7/1997 | Carlisle et al. | |
| 5,832,090 A | 11/1998 | Raspotnik | |
| 5,883,810 A | 3/1999 | Franklin et al. | |
| 5,903,830 A | 5/1999 | Joao et al. | |
| 6,018,724 A * | 1/2000 | Arent | 705/44 |
| 6,314,519 B1 * | 11/2001 | Davis et al. | 726/4 |
| 6,473,740 B2 | 10/2002 | Cockrill et al. | |
| 6,675,153 B1 * | 1/2004 | Cook et al. | 705/74 |
| 6,834,796 B2 | 12/2004 | Anvekar et al. | |
| 6,901,387 B2 | 5/2005 | Wells et al. | |
| 7,627,526 B2 | 12/2009 | Williams et al. | |
| 8,175,938 B2 | 5/2012 | Olliphant et al. | |
| 2002/0052841 A1 * | 5/2002 | Guthrie et al. | 705/40 |
| 2002/0095372 A1 | 7/2002 | Likourezos et al. | |
| 2002/0095376 A1 | 7/2002 | Likourezos et al. | |
| 2002/0095377 A1 | 7/2002 | Likourezos et al. | |
| 2002/0095379 A1 | 7/2002 | Likourezos et al. | |
| 2002/0194094 A1 | 12/2002 | Lancaster et al. | |
| 2003/0154139 A1 * | 8/2003 | Woo | 705/26 |
| 2006/0036544 A1 * | 2/2006 | Dharam | 705/40 |
| 2006/0122943 A1 * | 6/2006 | Mann et al. | 705/65 |
| 2006/0173776 A1 | 8/2006 | Shalley et al. | |
| 2007/0005432 A1 | 1/2007 | Likourezos et al. | |

(Continued)

OTHER PUBLICATIONS

U.S. Appl. No. 10/873,704, Non-Final Office Action mailed Sep. 17, 2008, OARN, 15 pgs.

(Continued)

*Primary Examiner* — Hani M Kazimi
*Assistant Examiner* — Hatem M Ali
(74) *Attorney, Agent, or Firm* — Schwegman, Lundberg & Woessner, P.A.

(57) ABSTRACT

Some embodiments may provide a method comprising receiving an identification of an entity from a network-based commerce system and receiving authentication data associated with the entity from the network-based commerce system, a combination including the authentication data and the identification being operable to facilitate a transfer of value affecting a first account associated with the entity, the transfer of value further affecting a second account associated with the network-based commerce system, the authentication data and the identification of the entity being insufficient for the network-based commerce system to identify the first account.

33 Claims, 8 Drawing Sheets

(56) References Cited

U.S. PATENT DOCUMENTS

| | | | |
|---|---|---|---|
| 2007/0083460 A1* | 4/2007 | Bachenheimer | 705/38 |
| 2007/0118476 A1 | 5/2007 | Likourezos et al. | |
| 2007/0244809 A1* | 10/2007 | Meeks | 705/39 |
| 2008/0162345 A1 | 7/2008 | Passanha | |
| 2012/0215697 A1 | 8/2012 | Olliphant et al. | |

OTHER PUBLICATIONS

U.S. Appl. No. 10/873,704 Response filed May 5, 2008 to Non-Final Office Action mailed Jan. 15, 2008, 22 pgs.
U.S. Appl. No. 10/873,704 Non-Final Office Action mailed Jan. 15, 2008, 3 Pages.
"Bemrose Smart Voucher", http://www.bemrosesmartvoucher.com/, (No date listed).
"eFunds Partners with WildCard Systems for Stored Value", http://www.paymentsnews.com/2004/11/efunds_partners.html, Payments News, (Nov. 16, 2004).
"HNC Delivers Fraud Detection for Stored Value Cards", http://www.taborcommunications.com/dsstar/01/0123/102589.html, DS Star Action Items, (No date listed).
"Introducing ComdataÅ?s Stored Value Solutions", http://www.storedvalue.com/, Comdata, (No date listed).
"OCC 96-48—Subject: Stored Value Card Systems", http://www.occ.treas.gov/ftp/bulletin/96-48.txt, Description: Information for Bankers and Examiners, (1996).
"Payment mechanisms designed for the Internet", http://ntrg.cs.tcd.ie/mepeirce/Project/oninternet.html, (Copyright 1994-2001).
"PayPal", http://en.wikipedia.org/wiki/PayPal, From Wikipedia, (Jun. 28, 2007).
"PayPal's Small Bite of Physical Stored Value May Herald Bigger Things", http://www.digitaltransactions.net/newsstory.cfm?newsid=790, Digital Transactions, (Dec. 2, 2005).
"Printed Products", http://www.scientificgames.com/sgcorp/printed_products.asp, Scientific Games Corporation, (2006).
"Scientific Games Corporation", http://www.scientificgames.com/sgcorp/index.asp, (2006).
"Stored Value Card", http://www.optimumpay.com/solutions/storedvaluecard/, Optimum Pay, Inc., (2005).
"Stored Value Systems and Coinstar Open New Gift Card Distribution Channels", http://www.paymentsnews.com/2005/06/stored_value_sy.html, Payments News, (Jun. 9, 2005).
"Stored Value Systems and Gift Card Solutions Introduce Big Boy Gift Card; '50s Icon and Home of the Original Double-Decker Burger", http://www.ceridian.com/corp/article/1,2868,10962-52854,00.html, Business Wire Press Release, (Jul. 8, 2003).
"Stored Value Systems Announces Integration of Gift Card Services with MICROS", http://www.ceridian.com/corp/article/1,2868,10962-53144,00.html, Press Release, (Oct. 22, 2003).
"Stored-Value Card—Overview", http://fms.treas.gov/storedvalue/index.html, (Mar. 9, 2007).
"The Bemrose Smart Voucher Stored Value system", http://www.bemrosesmartvoucher.com/how_it_works.htm, Bemrose—How it works, (No date listed).
Grabianowski, Ed, "How PayPal Works", http://money.howstuffworks.com/paypal1.htm, (Copyright 1997-2007).
U.S. Appl. No. 10/873,704, Response filed Dec. 17, 2008 to Non-Final Office Action mailed Sep. 17, 2008 , 18 pgs.
U.S. Appl. No. 11/618,705, Non-Final Office Action mailed Nov. 26, 2008, 11 pgs.
U.S. Appl. No. 11/618,705, Response filed Feb. 24, 2009 to Non-Final Office Action mailed Nov. 26, 2008 12 pgs.
U.S. Appl. No. 11/618,705, Response filed Oct. 22, 2008 to Non-Final Office Action (Restriction Requirement) mailed Sep. 22, 2008, 9 pgs.
U.S. Appl. No. 11/873,704, Non-Final Office Action mailed Mar. 23, 2009, 14 pgs.
U.S. Appl. No. 10/873,704, Non Final Office Action Mailed Sep. 16, 2009, 14 pgs.
U.S. Appl. No. 10/873,704, Non Final Office Action mailed Mar. 23, 2009, 12 pgs.
U.S. Appl. No. 10/873,704, Response filed Jun. 18, 2009 to Non Final Office Action mailed Mar. 23, 2009, 23 pgs.
U.S. Appl. No. 11/618,705, Advisory Action mailed Jul. 15, 2009, 3 pgs.
U.S. Appl. No. 11/618,705, Final Office Action mailed May 1, 2009, 13 pgs.
U.S. Appl. No. 11/618,705, Response filed Jul. 1, 2009 to Final Office Action mailed May 1, 2009, 11 pgs.
U.S. Appl. No. 11/618,705, Response filed Jul. 15, 2009 to Advisory Action mailed Jul. 15, 2009, 11 pgs.
U.S. Appl. No. 11/618,705, Restriction Requirement mailed Sep. 22, 2008, 5 pgs.
U.S. Appl. No. 11/873,704, Response filed Jun. 18, 2009 to Non Final Office Action mailed Mar. 23, 2009, 23 pgs.
U.S. Appl. No. 10/873,704, Non. Final Office Action mailed Jan. 5, 2011, 14 pgs.
U.S. Appl. No. 10/873,704, Response Filed Mar. 31, 2011 to Non-Final Office Action Received Jan. 5, 2011, 23 pgs.
U.S. Appl. No. 11/618,705, Non Final Office Action mailed Feb. 6, 2011, 14 pgs.
U.S. Appl. No. 10/873,704, Response filed Jul. 27, 2011 to Final Office Action mailed Jun. 9, 2011, 23 pgs.
U.S. Appl. No. 10/873,704, Advisory Action mailed Aug. 29, 2011, 2 pgs.
U.S. Appl. No. 10/873,704, Final Office Action mailed Jun. 9, 2011, 16 pgs.
U.S. Appl. No. 10/873,704, Non Final Office Action mailed Jan. 5, 2011, 14 pgs.
U.S. Appl. No. 10/873,704, Pre-Appeal Brief Request for Review mailed Sep. 9, 2011, 6 pgs.
U.S. Appl. No. 10/873,704, Response Filed Mar. 31, 20111 to Non-Final Office Action Received Jan. 5, 2011, 23 pgs.
U.S. Appl. No. 11/618,705, Appeal Brief Filed Jun. 27, 2011, 35 pgs.
U.S. Appl. No. 11/618,705, Final Office Action mailed Apr. 27, 2011, 17 pgs.
U.S. Appl. No. 11/618,705, Final Office Action Received Apr. 27, 2011, 17 pgs.
U.S. Appl. No. 11/618,705, Non Final Office Action mailed Feb. 16, 2011, 14 pgs.
U.S. Appl. No. 11/618,705, Response filed Apr. 6, 2011 to Non-Final Office Action received Feb. 16, 2011, 17 pgs.
U.S. Appl. No. 11/618,705, Response filed Apr. 6, 2011 to Non Final Office Action mailed Feb. 6, 2011, 17 pgs.
U.S. Appl. No. 10/873,704, Appeal Brief filed Oct. 31, 2011, 36 pgs.
U.S. Appl. No. 10/873,704, Decision on Pre-Appeal Brief Request mailed Oct. 17, 2011, 2 pgs.
U.S. Appl. No. 10/873,704, Notice of Allowance mailed Jan. 9, 2012, 8 pgs.
U.S. Appl. No. 11/618,705, Examiner's Answer to Appeal Brief mailed Aug. 26, 2011, 18 pgs.
U.S. Appl. No. 10/873,704, Response filed Jul. 15, 2010 to Final Office Action mailed Apr. 15, 2010, 22 pgs.
U.S. Appl. No. 10/873,704, Non-Final Office Action mailed Aug. 4, 2010, 7 pgs.
U.S. Appl. No. 10/873,704, Response filed Oct. 28, 2010 to Non Final Office Action mailed Aug. 4, 2010, 17 pgs.
U.S. Appl. No. 11/618,705, Advisory Action mailed Jun. 14, 2010, 2 pgs.
U.S. Appl. No. 11/618,705, Response filed Jun. 1, 2010 to Final Office Action mailed Mar. 29, 2010, 15 pgs.

* cited by examiner

US 8,738,517 B2

AUTHENTICATION DATA-ENABLED TRANSFERS

TECHNICAL FIELD

The present application relates generally to the technical field of methods and systems to perform on-line payment processing.

BACKGROUND

In recent years, the Internet has made possible online commerce services. Typically, a customer visits the web site of a merchant that has set up a network-based commerce system. Once the customer has selected some items to buy, the customer follows hyperlinks to a section of the web site (for example, to a "Checkout" page) where the customer is asked to enter information about the customer's method of payment for the items such as a credit card number, credit card verification code, bank account number, or the like. The web site may query the customer as to whether the network-based commerce system should store such account-identifying information in case the customer later returns to the merchant's web site to purchase other items sometime later, so that the customer does not need to re-enter this information.

Once the customer enters the information, the network-based commerce system may contact the customer's bank, a credit card processor, or other financial institution and request a transfer of funds.

This technique may be undesirable since it necessitates making available private account information to a number of different merchants. While most merchants are honest, the more merchants' network-based commerce system 104s store private account-identifying information that may be used to facilitate transfers of funds from a customer's accounts, the higher the possibility that some unscrupulous merchant may commit a fraud. It may also be undesirable or costly for a merchant to maintain a "merchant account" to enable direct payments with credit card processors or other financial institutions.

To overcome these drawbacks, some merchant web sites are configured as follows: When a customer has selected items or services to purchase and goes to the "Checkout" portion of the web site, the customer's web browser is redirected to a network-based payment system 110, typically run by a separate organization from the merchant. The redirection is accompanied by data or other token specifying the amount to be paid and the identity of the merchant. Once redirected, the customer may enter his/her password or other authenticating information and an indication of approval of the transaction to the network-based payment system, whereupon the network-based payment system may transfer the appropriate funds from the customer's account to the merchant's account, and then redirect the customer's browser back to the merchant's web site, sending along data or other tokens indicating that the payment for the items has been successfully made.

This type of system also has drawbacks, in that the customer's unity of experience is broken by being redirected to the network-based payment system web site and back to the merchant's web site. This type of system also makes more difficult some desirable features of merchants' web sites, such as the ability to allow a customer to create a store account, enter a promotional code at checkout time, or provide other value added services.

BRIEF DESCRIPTION OF THE DRAWINGS

Some embodiments are illustrated by way of example and not limitation in the figures of the accompanying drawings in which.

DETAILED DESCRIPTION

Figure 1:
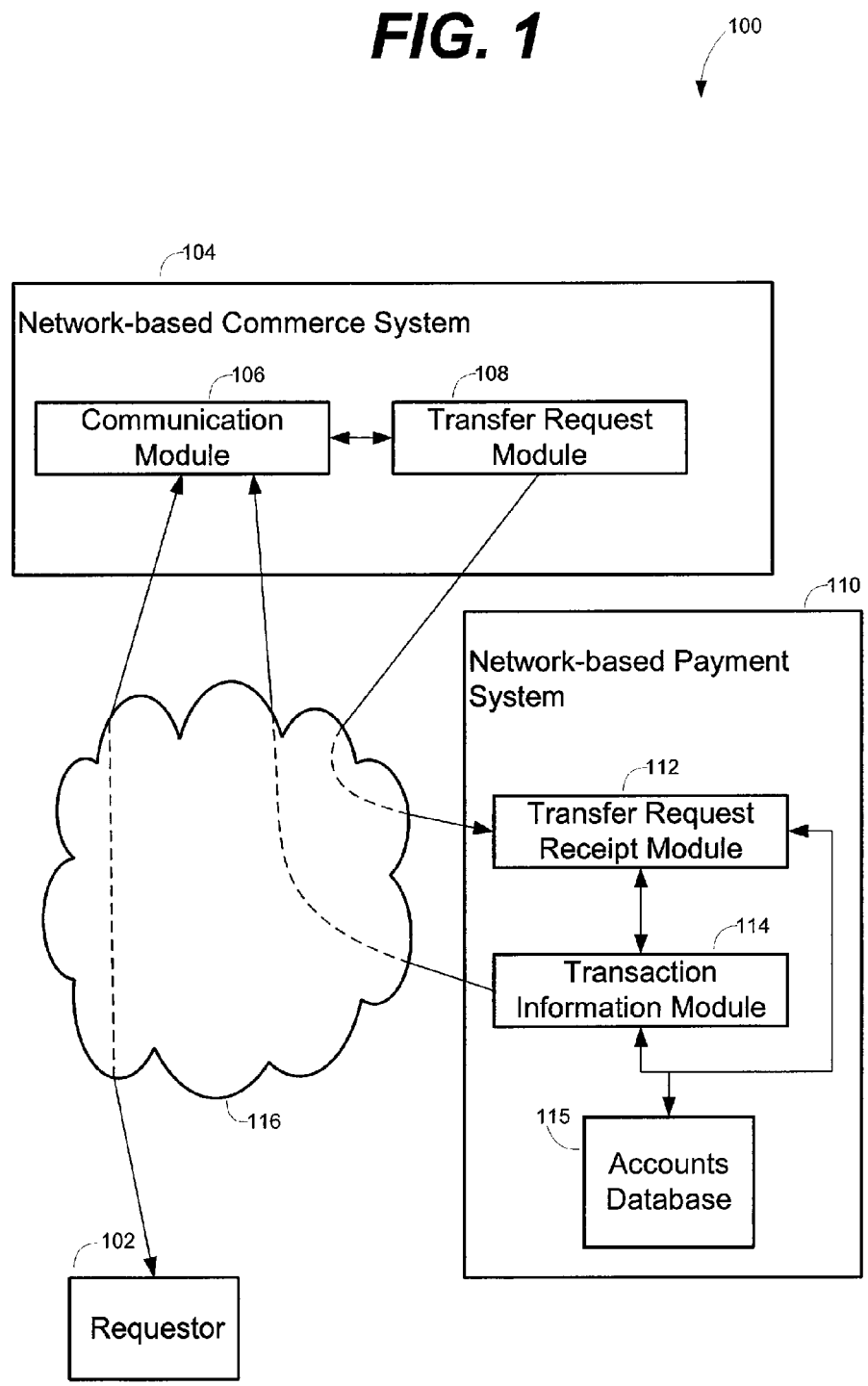
FIG. 1 is a block diagram illustrating a system for facilitating a transfer of value affecting an account associated with an entity, according to an example embodiment.

Example methods and systems to facilitate authentication data-enabled transfers are described. In the following description, for purposes of explanation, numerous specific details are set forth in order to provide a thorough understanding of example embodiments. It will be evident, however, to one skilled in the art that the present invention may be practiced in other embodiments without these specific details.

Introduction

This specification includes descriptions of various example embodiments of systems and methods by which a customer (or other entity, or third-party requestor acting on behalf of an entity or customer) purchasing goods or services from a network-based commerce system may provide the network-based commerce system with certain credentials. These credentials, in conjunction with payment details, may, in some embodiments, be in turn transmitted or communicated to a network-based payment system to authorize one or more payments or other transfers of value between an (e.g., first) account associated with the customer and an (e.g., second) account associated with the network-based commerce system. This transfer may in some embodiments be to the benefit of the network-based commerce system (or some participant thereof), although refunds to the benefit of the entity may also be supported in some embodiments.

In an example embodiment, a customer or other entity may log in (e.g., through the use of a web browser, such as for example INTERNET EXPLORER™, produced by Microsoft Corporation of Redmond, Wash., or other technology, such as, for example, the SKYPE® voice over IP system, provided by eBay, Incorporated of San Jose, Calif.) to a website or other data presentation facility associated with a network-based commerce system such as, for example, maintained by a merchant of goods or services.

After browsing or otherwise viewing listings of available goods or services offered by the network-based commerce system, the customer may be served a web page or other presentation by the network-based commerce system to provide the customer with an opportunity to authorize payment for goods or services selected by the customer. In response, the customer may enter an entity identification (e.g., an identification of an entity—which may be the customer or a third party, such as a company that authorizes a customer to charge purchases to a company credit card—that is to provide payment for the selected goods or services) and authentication data associated with the entity into the customer's web browser or other input device available to the customer. Once entered, this identification and authentication data may be transmitted or communicated via various media to the network-based commerce system. The network-based commerce system upon receiving the entity identification and the authentication data may then transmit the identification and authentication data as well as, in some embodiments, other information such as, for example, the amount of value such as denominated in a currency to be transferred from an account maintained by the network-based payment system on behalf of the entity to an account maintained on behalf of the network-based commerce system 104.

The combination of the entity identification and authentication data may be encrypted and/or combined with information about the transfer of value to be affected and authentication or other credentials allowing the network-based payment system to verify the authenticity of the transmission as originating from the network-based commerce system.

In response to the receipt of the transmission from the network-based commerce system, the network-based payment system may effect the transfer of value and in response transmit or otherwise communicate a message or other indication to the network-based commerce system confirming the transfer of value, whereupon the network-based commerce system may inform the customer or other requestor that the transfer of value or payment has successfully occurred. In this situation, the identification of the entity and the authentication data may be said to be "operable" to effect the transfer of value. On the other hand, in some embodiments, the network-based payment system may communicate to the network-based commerce system that the transfer of value requested was not affected either because the entity identification or authentication data transmitted were invalid or because the authentication data is associated with transfer limiting data describing constraints on the types and amounts of transfers of value from an account associated with the customer or other entity that would have been violated, if the transfer of value were effected.

In some embodiments, a customer may need to initially communicate with the network-based payment system to establish one or more accounts and to establish one or more pieces of authentication data associated with those accounts. This process is described in further detail below. The accounts may be, in some embodiments, funded accounts maintained by the network-based payment system or in some embodiments, accounts separate from the network-based payment system but over which the entity has given some control to the network-based payment system. Examples of external accounts may include, for example, credit card, bank or securities accounts, accounts containing loyalty points such as frequent flyer miles, or accounts denominated in terms of fractional ownership of commodities or precious metals.

In some embodiments, the authentication data transmitted by the requester of the transaction may not, e.g., in conjunction with the entity identification, have been operable prior to the accepting of that authentication data.

While this specification describes embodiments in which various types of data is transmitted and received or otherwise communicated via a network such as, for example, the Internet, it will be appreciated that various transmission media such as wireless networking, wired and wireless telephony, text messaging, internet telephony and many other media may be used to facilitate the various transmissions, receptions and acceptances described herein in regard to example systems for facilitating the transfer of value. Further, it will be appreciated that some embodiments, communication among the various systems and modules by be synchronous, asynchronous, or may be indirect, such as by one module storing a communication in a database or other storage device and indicating to another module its presence, without communicating its content.

For the purposes of this specification, a "module" includes an identifiable portion of code or data or computational object to achieve a particular function, operation, processing, or procedure.

Authentication data-enabled transfers may have several example technical benefits. For example, because a user may need to log in to a network-based payment system less frequently, fewer IP address lookups to find the IP address of a network-based payment system web site may be required of domain name servers and fewer pages need to be served by network-based payment system web servers, thus reducing communication bandwidth and/or processor usage. may be achievable for a network-based publication system supporting authentication data-enabled transfers. Another example technical benefit of authentication data-enabled transfers may include a reduction of communication between network-based commerce systems and financial institutions, since in some embodiments, multiple individual e.g., credit card transactions that are currently handled by direct communication between network-based commerce systems and credit card processors may be aggregated and batch-transmitted together by a network-based payment system acting on behalf of multiple network-based commerce systems.

Example Systems for Effecting or Facilitating Transfers of Value

FIG. 1 is a block diagram illustrating a system 100 for facilitating a transfer of value affecting an account associated with an entity, according to an example embodiment.

In system 100, a requestor 102 such as a customer, or other entity, or a requestor acting on behalf of an entity communicates with a network-based commerce system 104 via a network 116 or other communication medium. System 100 also includes a network-based payment system 110 able to communicate with network-based commerce system 104 via network 116 or other communication medium. The network-based commerce system 104 may include various modules or components such as, for example, a communication module 106 and a transfer request module 108. A network-based payment system 110 may include a transfer request receipt module 112 and a transaction information module 114. The transfer request receipt module 112 and transaction information module 114 may be operatively connected to an accounts database 115. The accounts database 115 may include tables providing cross references between account and entities on whose behalf the network-based payment system 110 manages or manipulates those accounts and authentication data associated with those accounts such as, for example, personal identification numbers. In some embodiments, evaluation of validity, transfer limiting data, and/or transfers of value may be carried out by the transfer request receipt module 112, while in some embodiments these functions may be carried out by one or more other modules within the network-based payment system 110.

Example Processes for Effecting Transfers of Value

Figure 2:
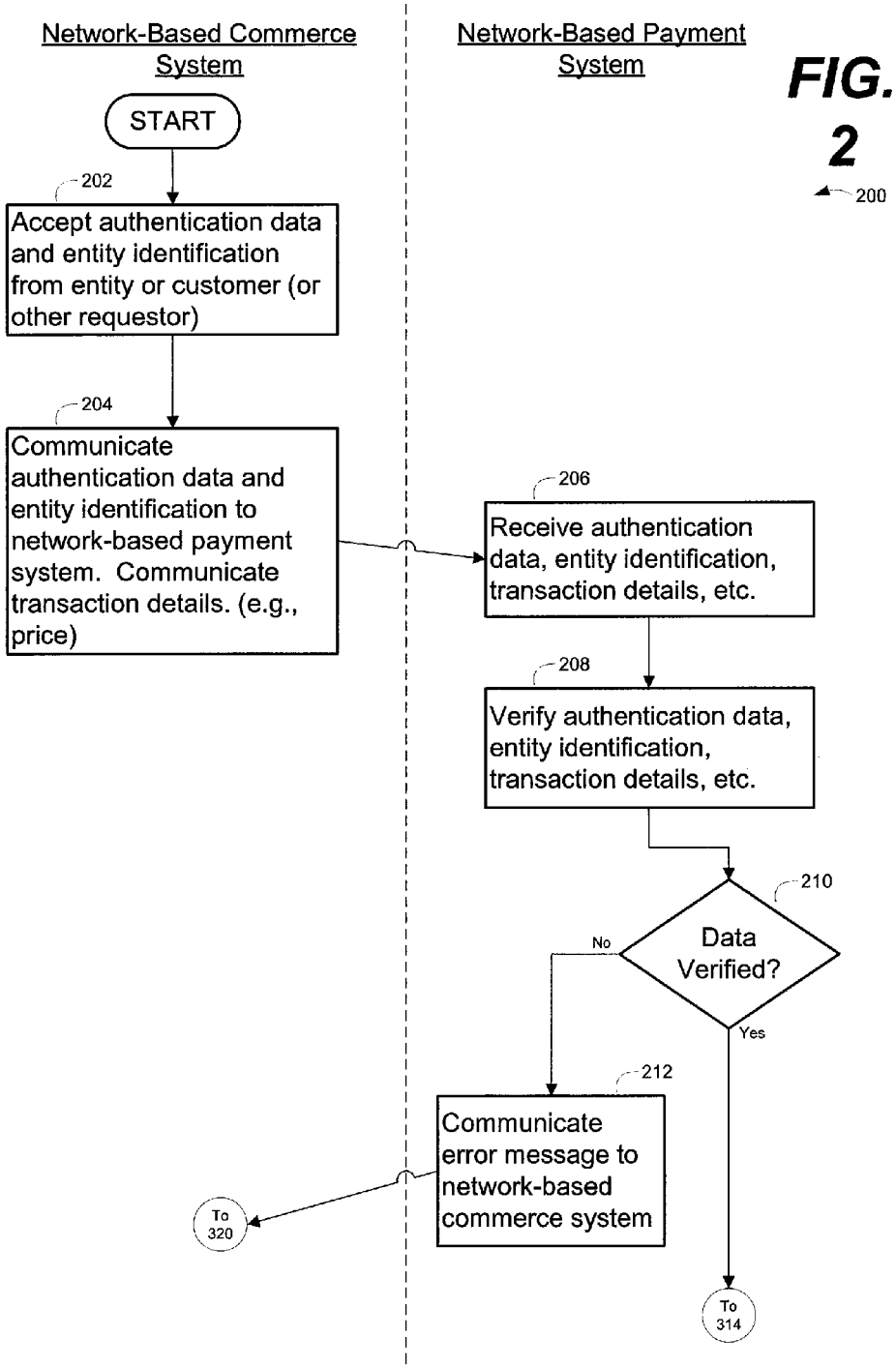
FIG. 2 and FIG. 3 present a flowchart of a process for effecting or facilitating a transfer of value, according to an example embodiment.
Figure 3:
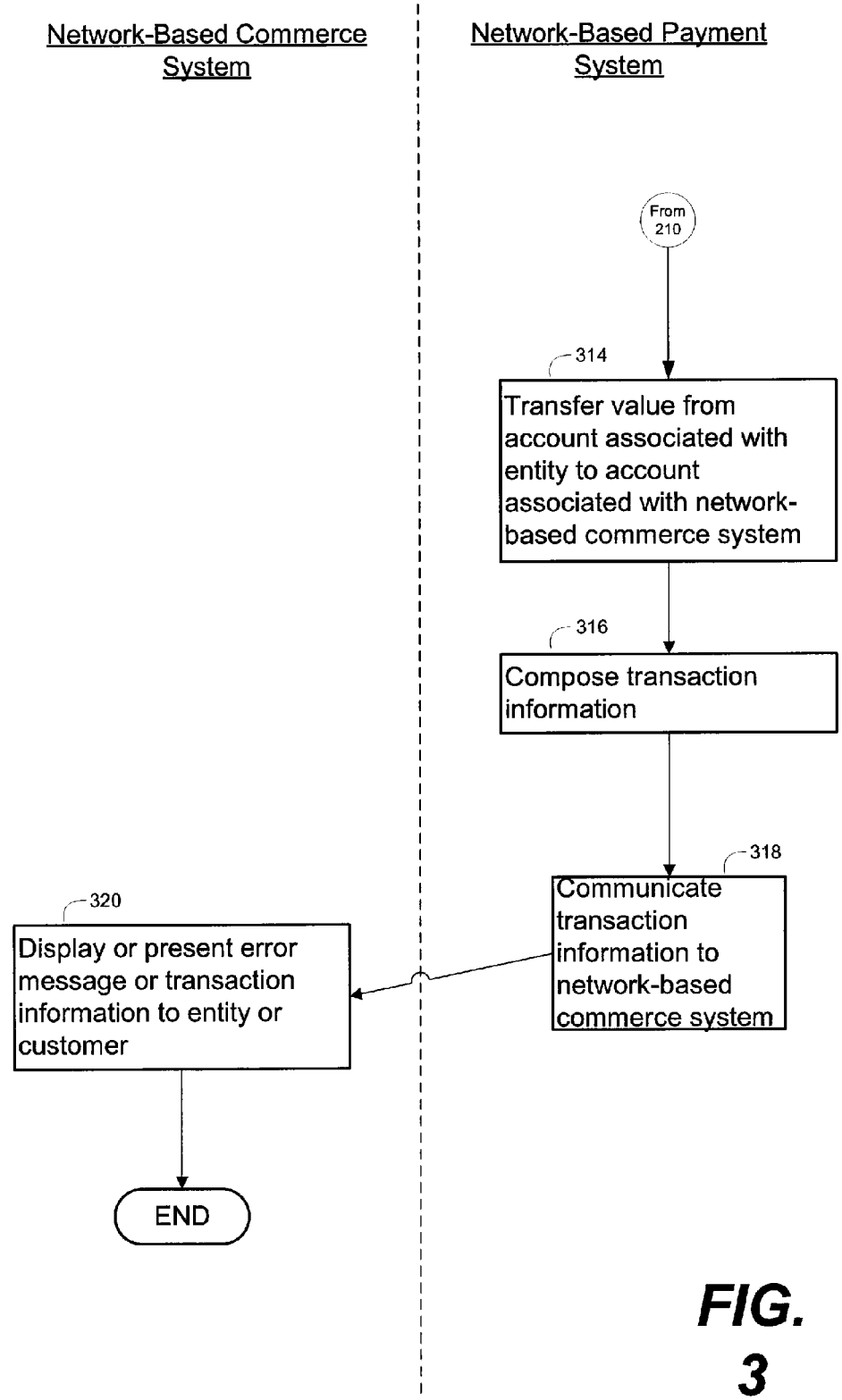

FIG. 2 and FIG. 3 present a flowchart of a process 200 for effecting or facilitating a transfer of value, according to an example embodiment.

At block 202, a network-based commerce system 104 may accept authentication data and entity identification from a requestor 102 (e.g., an entity or customer, or one acting on behalf of the entity). As mentioned above, this authentication data and entity identification may be accepted through reception over the Internet or other network or transmission medium. In some embodiments, these data items may be accepted together in a single transmission from a requestor. In some embodiments, they may be accepted at separate times during a single or during separate communication sessions. For example, requestor may log into a merchant's web site providing an email address as one example of an entity identification, and sometime later provide authentication data, such as a personal identification number (PIN) during a checkout process.

At block 204, the network-based commerce system 104 may communicate the authentication data and the identification of the entity to the network-based payment system 110. This communication may also include the communication of transaction details such as, for example, the price of a good or service being purchased, or other payment such as a total price, a fee or tax, or the like, via the network-based commerce system 104 by the entity or on behalf of the entity, or other indication of a transfer of value. It will be appreciated that in some embodiments the network-based commerce system 104 may provide refunds in which a transfer of value is to occur from an account associated with the network-based commerce system 104 to an account associated with the entity.

At block 206, in response to the communication transmitted by the network-based commerce system 104, the network-based payment system 110 may at block 206 receive authentication data, identification of the entity and other transaction details. This process may be carried out by the transfer request receipt module 112. At block 208, the network-based payment system 110 may verify the authentication data, entity identification and transaction details. In addition, the network-based payment system 110 may, at block 208, also verify the authenticity of the communication as being from the network-based commerce system 104. The processing in block 208 may in some embodiments also be carried out by the transfer request receipt module. At decision box 210, a decision may be made by the network-based payment system 110 as to whether the data received in the block 206 was verified. If the data was not verified at block 212, an error message may, in some embodiments, be communicated to the network-based commerce system 104 describing the error or other reason for data invalidity, whereupon processing may continue within the network-based commerce system 104 at block 320 of FIG. 3. If the data is verified at decision box 210, a determination may be made that the data including the entity identification and authentication data is operable to facilitate the transfer of value and accordingly, processing may continue within the network-based payment system 110 at block 314 of FIG. 3.

At block 314, the network-based payment system 110 may perform or otherwise carry out the transference of value from an account associated with the entity to an account associated with the network-based commerce system 104. In some embodiments, the transfer of value may be from an account associated with the entity to an account associated with a third party that has delegated payment collection authority to the network-based commerce system 104. At block 316 the network-based payment system 110 may compose transaction information to be transmitted or otherwise communicated to the network-based commerce system 104. This transaction information may include the transaction result (e.g., whether the transfer was successful or not, and if not, a reason) of the transaction, information about the source of the transfer of value, the balance available for transfer from a source of the transfer of value or other information, or an address of an entity to be used for shipping purposes. In some embodiments, a network-based commerce system 104 may, prior to actually requesting the transfer of value, transmit a balance query to the network-based payment system 110 that includes the entity identification and authentication data. In response, the network-based payment system may transmit a message including the entity's balance for display to the customer and/or to determine whether there is sufficient funds for the proposed transfer.

The transaction information may be composed by the transaction information module 114 and communicated to the communication module 106 or in some embodiments to the transfer request module 108 of the network-based commerce system 104.

At block 320, a network-based commerce system 104 may display or present an error message or transaction information to the transfer of value requestor such as a customer or the entity, such as by the communication module 106.

Example User Interfaces

Figure 4:
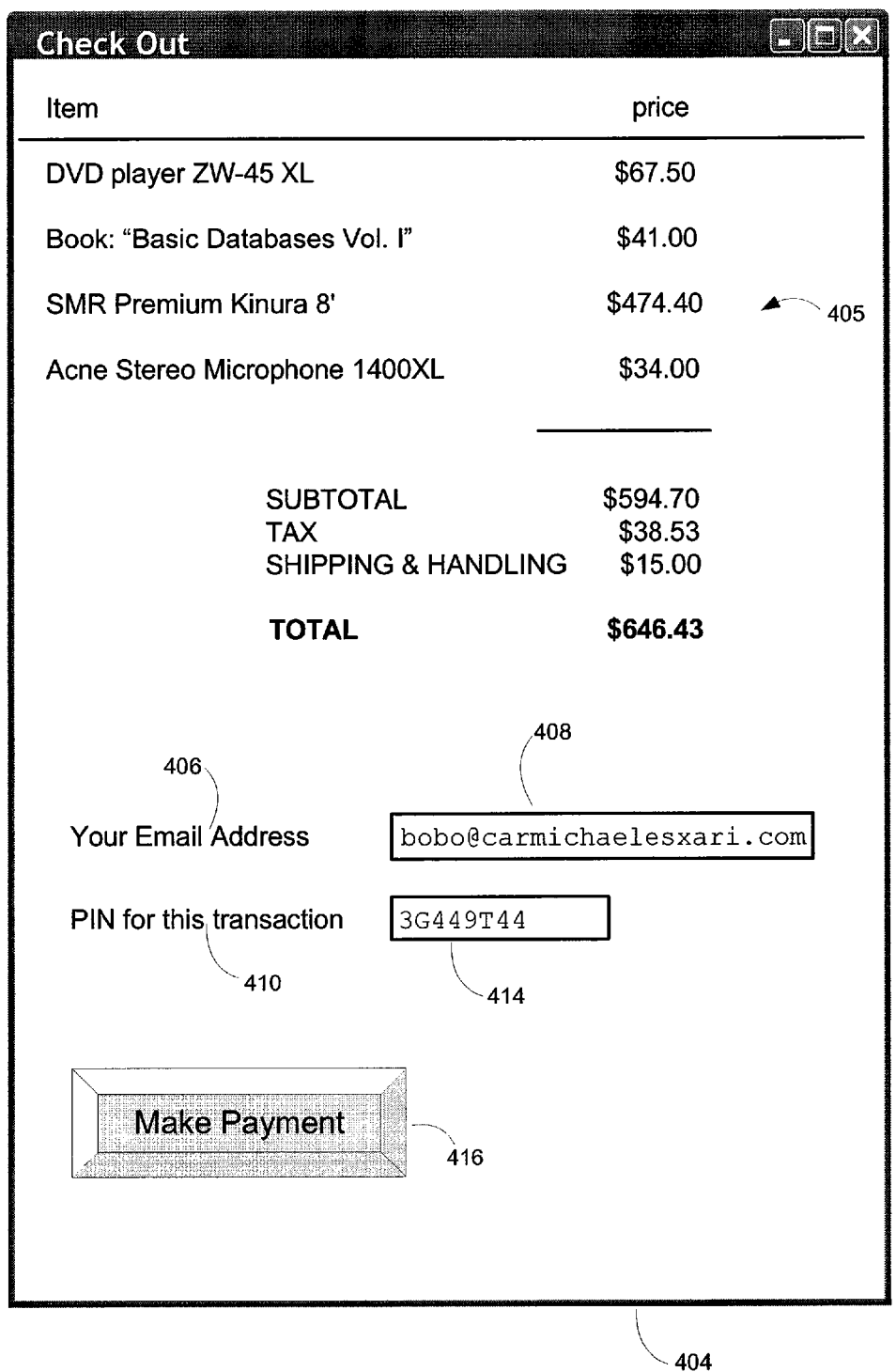
FIG. 4 illustrates an example user interface for effecting a transfer of value, according to an example embodiment.

FIG. 4 illustrates an example user interface for effecting a transfer of value, according to an example embodiment.

FIG. 4 illustrates a user interface window 404 as may be presented by a network-based commerce system 104 to a requester of a transfer of value in which the requestor may be an entity such as a customer or requester who is requesting the transfer of value on behalf of some entity. In some embodiments, a transfer value may be made in payment for goods or services selected from goods or services made available by a network-based commerce system 104. The user interface window 404 may be presented by a network-based commerce system 104 to a customer such as by transmission of a web page or other markup language document at the time the customer desires to complete the purchase of one or more goods or services. It will be appreciated that a user interface such as the user interface window 404 may be presented to a customer without the customer needing to navigate away from the website or other data serving environment maintained by the network-based commerce system 104, or otherwise interact with a website or data serving environment of a system other than the network-based commerce system 104.

In the user interface window 404, a list of items that a customer may wish to purchase and may have selected is illustrated as the list 405. In the example of FIG. 4, four items are illustrated as well as their subtotal, a tax, a shipping and handling amount, and a grand total. This grand total may in some embodiments be the amount of value to be transferred. It will be appreciated that although the example illustrated in FIG. 4 shows a value to be transferred in a commercial currency, in some embodiments, other items of value may be used, such as for example, reward points, frequent flyer miles, coupons, coins, tokens, securities, commodities, real estate, precious or base metal, notes, bonds, or shares of any of these items, or other things of value. In some embodiments, the customer may communicate the amount of the transfer of value to be transferred in advance to a network-based payment system 110 and the network-based commerce system 104 need not provide an amount of transfer of value.

The user interface window 404 also includes two text input fields, input field 408 and input field 414 that may be filled in by a customer or other requestor using the requestor's input device (such as a web browser running on a customer's home computer) for subsequent transmission to the network-based commerce system 104. In addition, text labels 406 and 410 associated with the two input fields 408 and 414 may be provided to indicate the nature of entity identification and authentication data expected by the network-based commerce system 104. In the example user interface window 404, an identification of an entity, in this example an e-mail address, may be entered in input field 408 and an authentication data such as, for example, a PIN may be entered in input field 414. Once the requestor has entered the data, the requestor may press a button or other user interface control or affordance such as the "Make Payment" button 416 to transmit the request to effect or facilitate the desired transfer of value to the network-based commerce system 104. It will be appreciated that both persons as well as automated systems may provide data both via human-computer interfaces and via web services or other automated mechanisms. For example, HTTP forms, XML messages, or other communication techniques may be used to transfer data to and from the network-based commerce system 104, and security techniques such as secure sockets layer (SSL) communication, various types of encryption, and secure HTTP (HTTPS) may be employed.

It will be appreciated, in various embodiments, a variety of entity identification data and authentication data may be provided by requestor of a transfer of value to a network-based commerce system 104, and subsequently transmitted to a network-based payment system 110 to effect a transfer of value. For example, an identification of an entity may include an email address associated with that entity, a telephone number, a name (e.g., a user name or personal or corporate name) of an entity, an internet telephony user identifier such as, for example, that used with SKYPE® or other internet telephony provider, a customer identifier, an member number or other numerical entity identification, a bar code, or other data providing identification of an entity requesting or on whose behalf the transfer of value is being requested. It will be appreciated further that the authentication data may include a password, a digital signature, a personal identification number (PIN), one or more pieces of biometric data such as, for example, a fingerprint, a voice print, or other biologic scan, or other forms of authentication data.

In some embodiments, the authentication data and the identification of the entity may be insufficient for the network-based commerce system 104 to identify the account maintained by the network-based payment system 110 from which the transfer of value is to occur, which may be termed the "source account". In some embodiments, the network-based commerce system 104 may be unable to determine the identity of the account from which the transfer of value is to be made because neither the authentication data nor the identification of the entity, either separately or in combination, includes data identifying the source account. In some other embodiments, the combination of the authentication data and the identification of the entity, either together or separately, may include data identifying the source account, but this data may be unrecognizable or otherwise inaccessible to the network-based commerce system 104, such as by being encrypted or coded.

Although FIG. 4 illustrates an example of an input mechanism as it may be implemented using web browser technology, a variety of techniques may be used by which a requestor may request a transfer of value such as, for example, by entering an identification of entity and authentication data by a point-of-sale terminal, by telephone voice input, by optical character recognition or other input technologies or devices.

It will be appreciated that the interaction between a requestor 102 and the network-based commerce system 104, such as by using the user interface window 404, may be carried out or facilitated by the communication module 106.

Figure 5:
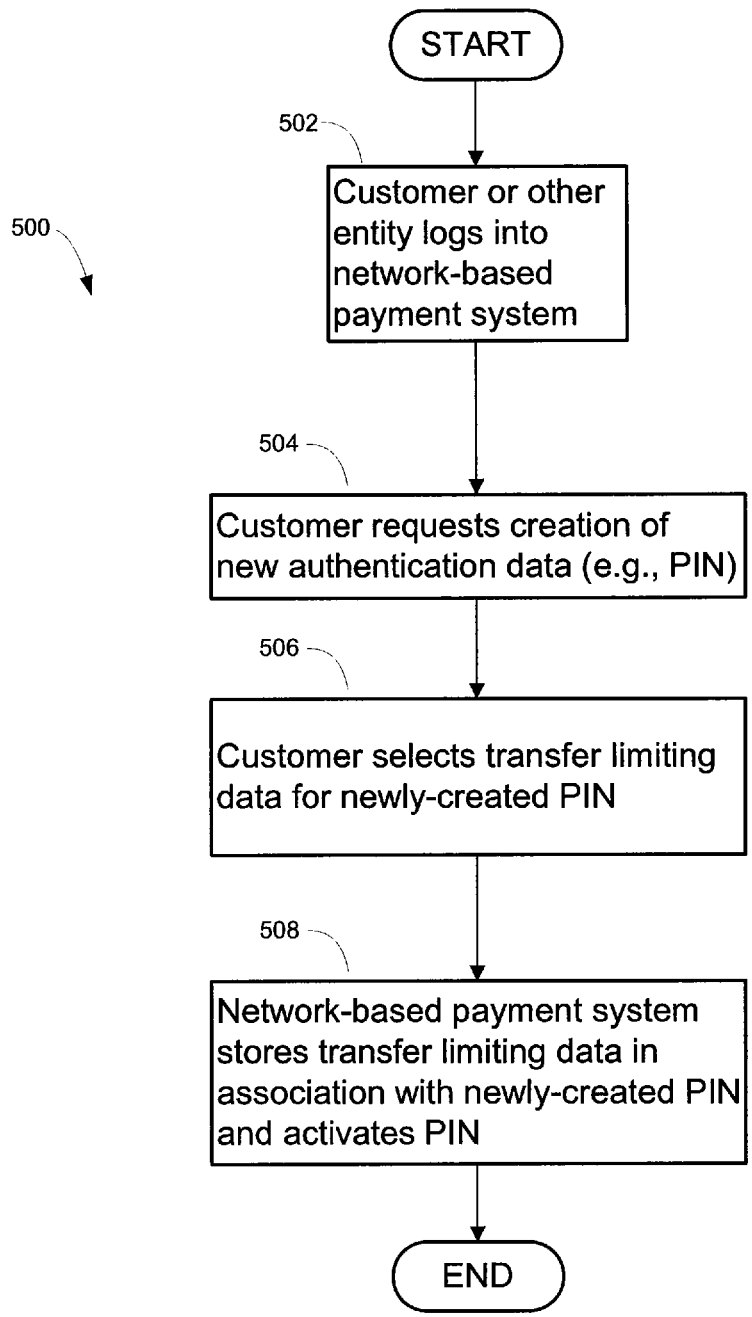
FIG. 5 is a flow chart illustrating a process by which a customer or other entity may establish a connection between entity identification and authentication data in an account controlled or managed by a network-based payment system, according to an example embodiment.

Example Processes for Establishing Accounts Associated with Identification of Entity and Authentication Data FIG. 5 is a flow chart illustrating a process 500 by which a customer or other entity may establish a connection between entity identification and authentication data in an account controlled or managed by a network-based payment system 110, according to an example embodiment.

At block 502 a customer or other entity may log into or otherwise contact a network-based payment system 110, for example, a payment system provided by PAYPAL® operated by eBay Incorporated of San Jose, Calif. In some embodiments, a customer may have an email address or other username and password stored within the network-based payment system 110 and may log in via the Internet, by telephone, or by some other medium to the network-based payment system 110. It will be appreciated that this password need not be the same as the authentication data associated with the entity. Once logged in, a customer or other entity may manipulate or otherwise modify the status of accounts controlled by or managed on behalf of the entity by the network-based payment system 110.

For example, once logged into the network-based payment system 110 the customer may open a new account, fund the account, create an account linked to a credit card, debit card, bank account or other source of funds or otherwise manage the payment processes and accounts managed on the entity's behalf by the network-based payment system 110. In some embodiments, the network-based payment system 110 may manage multiple accounts or payment sources or mechanisms on behalf of the customer or entity.

In some embodiments, the entity identification used to login to the network-based payment system 110 may be the same entity identification provided by a customer or other requester when requesting a transfer of value through a network-based commerce system 104.

At block 504, the customer or entity, while logged into the network-based payment system 110, may request a creation of a new authentication data such as, for example, a PIN. The customer may, in some embodiments, select one of the accounts managed by the network-based payment system 110 on behalf of the entity to be associated with the newly created authentication data. Once the network-based payment system 110 has created the new authentication data and stored it in a database, such as for example the accounts database 115, the network-based payment system 110 may provide an opportunity at block 506 for the customer to select transfer limiting data to associate with the newly created PIN or other authentication data. The transfer limiting data may be used to establish constraints on the types and amounts of transfers of value from the account to which the newly created PIN is associated. For example, the transfer limiting data may include merchant limitation data to specify which merchants or other network-based commerce systems 104 with which the PIN or other authentication data may be operable to facilitate transfers of value. The transfer limiting data may also include country data limiting the countries (or other geographic regions) from which or to which transfers of value may occur using the authentication data. The transfer limiting data may also include transaction context data defining allowable types of transactions for which a transfer of value facilitated or made operable by the authentication data may occur. The transfer limiting data may also specify a maximum value that may be carried out in a single transaction such as for example the maximum value for a single transfer value. Transfer limiting data may also provide a maximum aggregate value for one or more transfers of value occurring during a particular period of time, such as for example within a single day, within a single week, a single month, or a single year. Transfer limiting data could also be used to limit the use of the authentication data to a particular mode(s) by which the customer communicates with the network-based commerce system 104. For example, the authentication data may be effective only when a customer is requesting a transfer of value while connected via the Internet (e.g. online), via Internet telephony, via a mobile device (e.g. a mobile phone) and/or a particular combination of these modes. A master switch may be applied to a particular authentication data to either enable or disable it for facilitating transfers of value. It will be appreciated that, in some embodiments, transfer limiting data may include a variety of other constraints in addition to those described herein.

For purposes of example, a customer may create with the network-based payment system 110 a new PIN, P, to be associated with a funded account A, where the funded account contains $70,000. However, to minimize the danger of errors or fraud, the customer may create a PIN separate from the customer's account login password where the PIN P is associated with account A. The transfer limiting data associated with P may be configured by the entity so that transfers of value from account A using PIN P and the entity identification may only be requested by merchants R, S and T (e.g., in response to entry of entity identification and PIN P via a user interface such as that of FIG. 4) that maintain network-based commerce systems U, V and W respectively and may be further configured to specify a maximum aggregate value of transfers of value totaling no more than $600 per week may be permitted.

Figure 6:
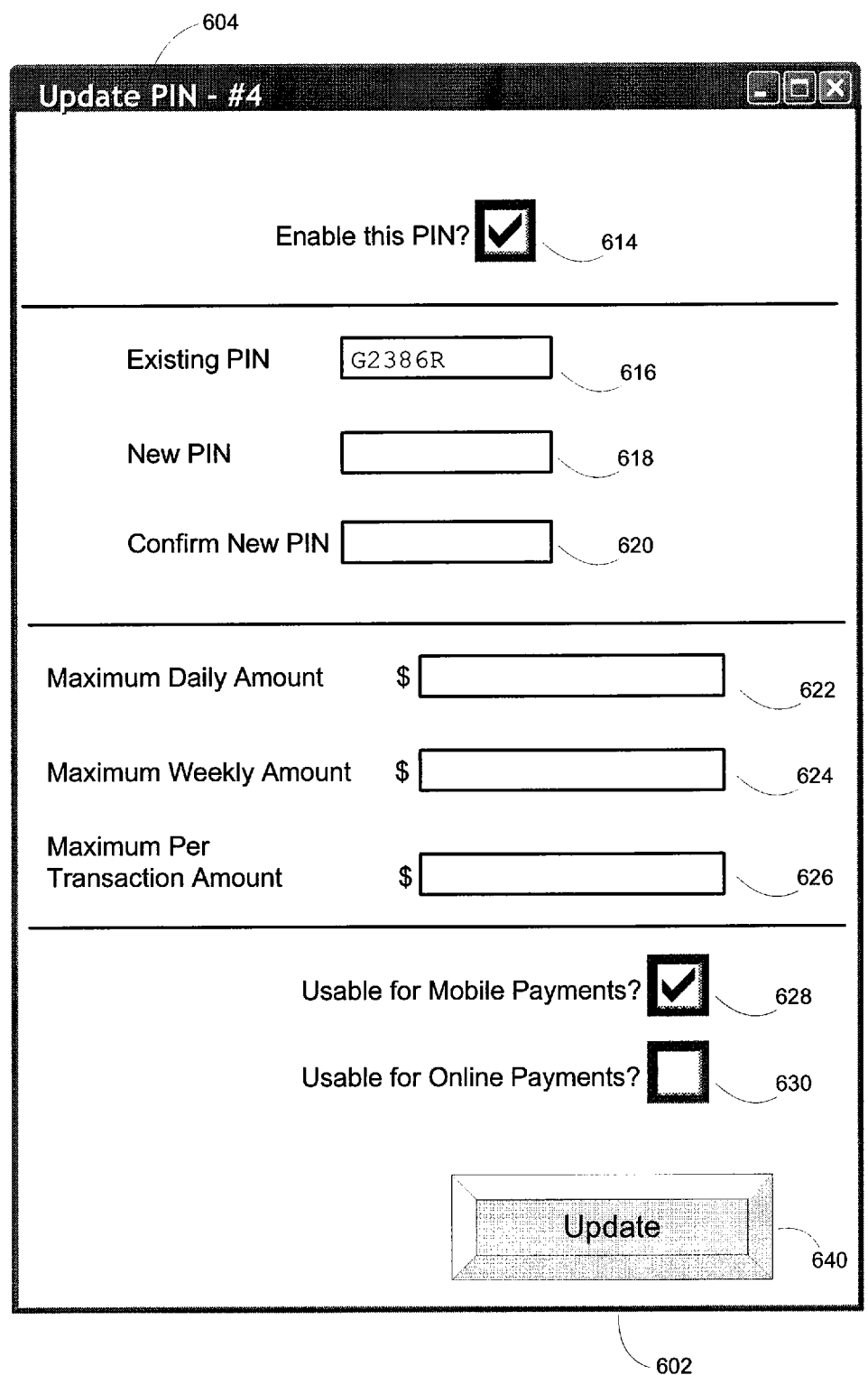
FIG. 6 illustrates an example of a user interface that may be used by a customer or other entity to control transfer limiting data, according to an example embodiment.

FIG. 6 illustrates an example of a user interface that may be used by a customer or other entity to control the transfer limiting data, according to an example embodiment. A customer may log into a network-based payment system 110, such as, for example via a web browser using SSL, and after logging into an entity account, and requesting to edit the settings for a particular authentication-limiting data associated with the entity, be presented with a user interface window 602 in FIG. 6. The window 602 may include an indication 604 of which of multiple separate authentication data associated with the entity the window 602 pertains. The customer may then enable or disable the authentication data (e.g. in FIG. 6, a PIN) using the check box 614, may observe the current pin as shown in text box 616 (which in some embodiments may be hidden or otherwise absent for security purposes), or change the PIN using text boxes 618 and 620. In addition, the user may use the text boxes 622, 624, and 626 and check boxes 628 and 630 to enter transfer limiting data to be associated with the PIN. Finally, the user my click on the "Update" button 640 to make the edits indicated in the window 602 effective into the network-based payment system.

Returning to the discussion of FIG. 5, in some embodiments, the authentication data may include identification of the entity in an encrypted form, while in some other embodiments the authentication data does not include an identification of the entity.

At block 508 the network-based payment system 110 may store the transfer limiting data in association with the newly created PIN or other authentication data and may then activate the PIN whereupon the PIN in conjunction with an identification of the entity may be operable to effect transfers of value according to the transfer limiting data.

Example Data Storage Within Network-Based Payment System

Figure 7:
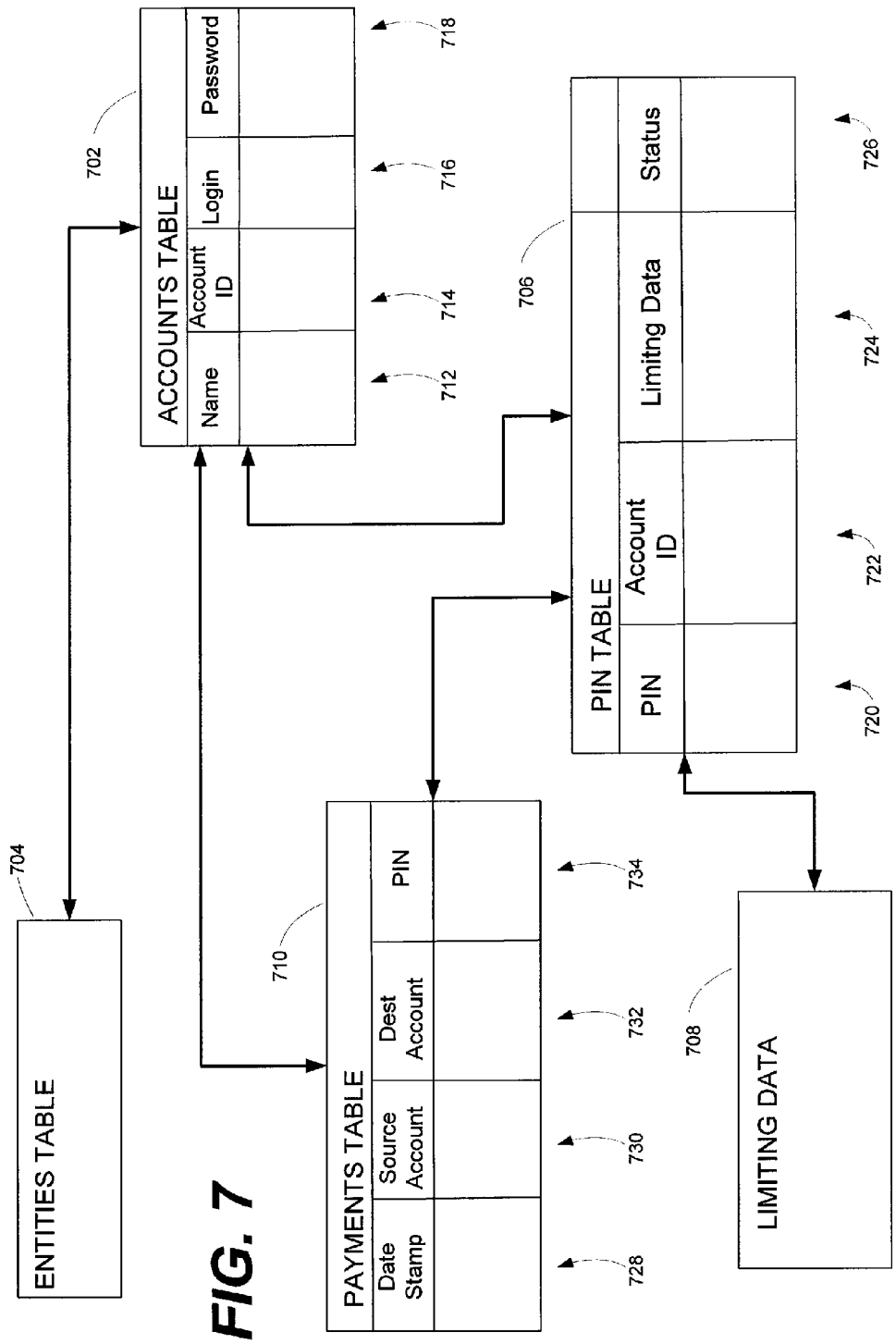
FIG. 7 is a block diagram of various database tables that a network-based payment system may store and maintain in its accounts database, according to an example embodiment.

FIG. 7 is a block diagram of various database tables that a network-based payment system 110 may store and maintain in the accounts database 115, according to an example embodiment. FIG. 7 illustrates in a diagrammatic form five relational tables: an accounts table 702, the entities table 704, a PIN table 706, and a payments table 710, as well as a limiting data table or limiting data storage data structure 708.

The entities table 704 may store information such as e.g. names, email addresses, or other information about the entities on whose behalf the network-based payment system 110 maintains accounts.

FIG. 7 also shows an accounts table 702 which may include information about accounts maintained by the network-based payment system 110. In some embodiments the accounts table 702 may include a column 712 providing a name of an account, such as for example a name of an entity to which the account belongs. The accounts table 702 may also include an account ID column 714, which may contain an account identification. The accounts table may further include a login column 716 and a password column 718, which may specify a login name and password used to access the account when an entity or other users login to the network-based payment system 110, such as when doing account maintenance, PIN creation or other administrative tasks. It will be appreciated that a single login and password may be shared among multiple accounts, such as for example when a network-based payment system 110 maintains several accounts for the same user. It will be appreciated that a number of other columns may be present in the accounts table 702.

The accounts database 115 may in some embodiments include a PIN table 706 for storing personal identification numbers, PINs or other authentication data to be used when network-based commerce systems 104 request transfers of value on behalf of entities. A PIN table 706 may include a PIN column 720 and an account ID column 722 which may be used to indicate the account within the accounts table 702 with which the PIN is associated. The PIN table may also include a status column 726 which may indicate whether the PIN is active, inactive, locked or other status. The PIN table may also include one or more limiting data columns 724. These limiting data columns 724 may be used as a reference to the limiting data table or limiting data storage data structure 708 or may be used to indicate an entry limiting data that describes the transfer limit data that constraints the use of the PIN described in the table row to which the criteria pertains.

The accounts database 115 may include a payments table 710. This payments table may be used to keep a record or audit trail of all the transfers of value such as, for example, payments for goods or services carried out by the network-based payment system 110 as requested by various network-based commerce systems 104. The payments table 710 may include a number of columns including a date or date/time stamp column 728 indicating the time when a transfer of value was effected, a source account column 730 and a destination account column 732 which may be references to the accounts table 702 indicating the source and destination of the transfer of value, and a PIN column 734 indicating which PIN, such as by reference to the PIN table 706, or other authentication data was used to effect the transfer of value.

It will be appreciated that although the operations of the process 500 and the structure of the PIN table 706 and payments table 710 has been described above in terms of PINs and their associated data, similar types of tables may be used in embodiments using other types of authentication data (e.g., passwords, biometric data, etc).

In some embodiments, accounts may be held as funded accounts directly by a network-based payment system 110. In some embodiments some of the accounts managed or maintained by the network-based payment system 110 may be external, such as for example bank or credit card accounts. In some embodiments, in either case, both funded and external accounts may be stored in an accounts table 702. It will be appreciated that for funded accounts a separate table or tables may be used to store balance information and that communication facilities to facilitate the communication between the network-based payment system 110 and the providers of external accounts, such as for example credit card companies and credit card processors, may be implemented.

Example Computer Systems for Carrying Out Operations

Figure 8:
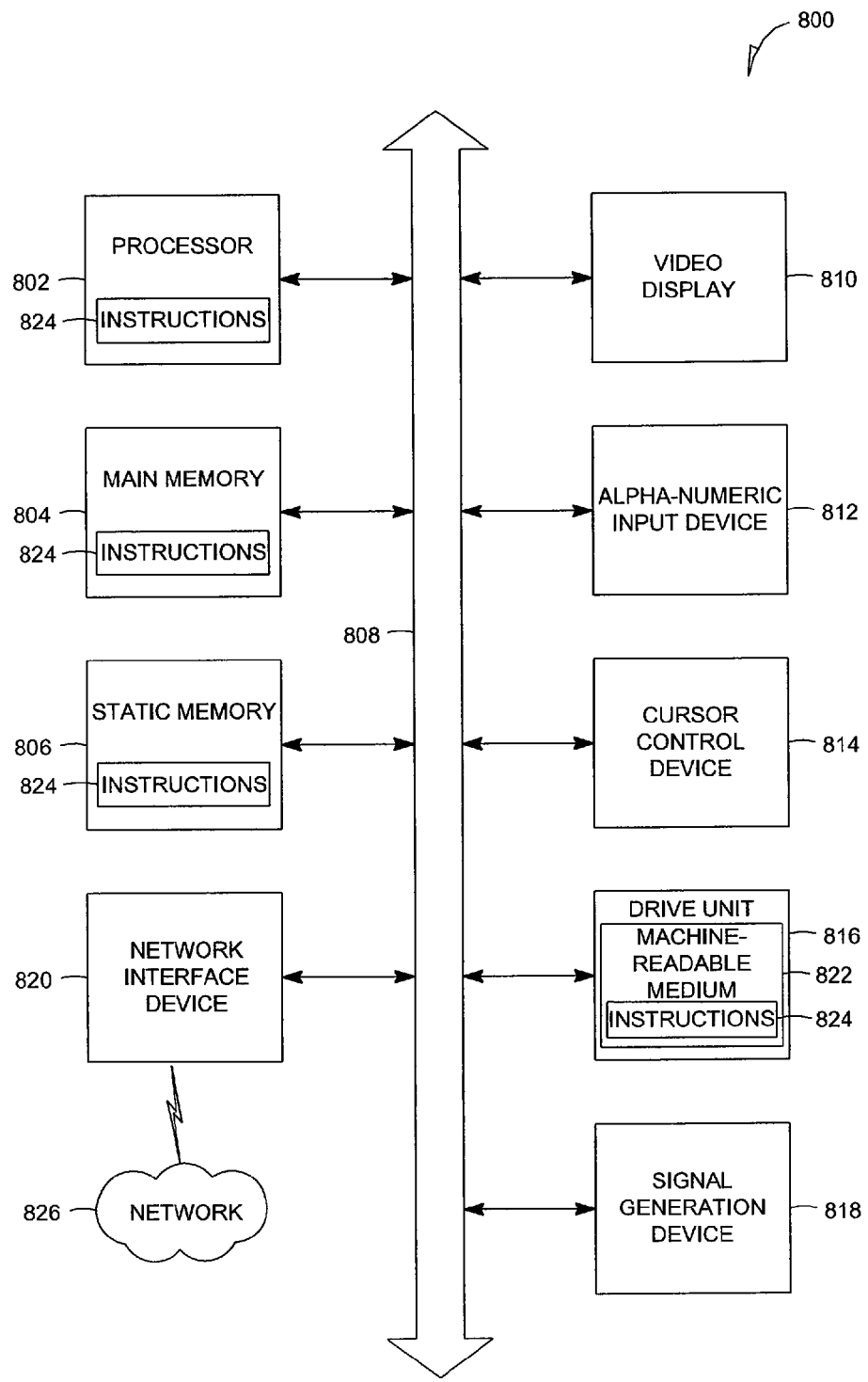
FIG. 8 shows a diagrammatic representation of machine in the example form of a computer system within which a set of instructions, for causing the machine to perform any one or more of the methodologies, processes, or operations discussed herein, may be executed.

FIG. 8 shows a diagrammatic representation of machine in the example form of a computer system 800 within which a set of instructions, for causing the machine to perform any one or more of the methodologies, processes, or operations discussed herein, may be executed. In some embodiments, a computer system 800 may be used by a requester to interact with a network-based commerce system 104 and/or network-based payment system 110. One or more computer systems 800 may, in some embodiments, be used to implement a network-based commerce system 104 and/or network-based payment system 110.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to carry out authentication-data enabled transfers have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a computer in a network-based payment system;
   a transaction module of the computer communicatively coupled to a network interface of the computer,
      the transaction module being configured to communicate transaction information with a network-based commerce system; and
   a transfer request receipt module of the computer communicatively coupled to the transaction module,
      the transfer request receipt module being configured to receive, from the network-based commerce system, an identification of an entity and authentication data associated with the entity,
      the authentication data and the identification being usable by the network-based payment system to facilitate a transfer of value affecting a first account associated with the entity,
      the transfer of value further affecting a second account associated with the network-based commerce system,
   a combination of the authentication data and the identification including data identifying the first account, the data being-unrecognizable by the network-based commerce system to identify the first account,
   the authentication data being associated with transfer limiting data selected for association with the authentication data, the transfer limiting data establishing a constraint on a type of the transfer of value.

2. The system as set forth in claim 1, wherein the transfer request receipt module is to receive transaction details associated with the transfer of value.

3. The system as set forth in claim 1, wherein the authentication data includes a personal identification number (PIN).

4. The system as set forth in claim 1, wherein the transfer limiting data includes at least one of a group consisting of merchant limitation data, country data, transaction context data, communication mode data, a maximum value for the transfer of value, a maximum aggregate value for at least one transfer of value occurring during a period of time, a maximum aggregate value for at least one transfer of value occurring during a day, a maximum aggregate value for at least one transfer of value occurring during a week, a maximum aggregate value for at least one transfer of value occurring during a month, and a maximum aggregate value for at least one transfer of value occurring during a year.

5. The system as set forth in claim 1, wherein the transfer of value includes a payment benefiting the network-based commerce system.

6. The system as set forth in claim 1, wherein the transaction information is associated with the transfer of value.

7. The system as set forth in claim 1, the system further comprising:
a communication module at the network-based commerce system, the communication module to accept the authentication data and the identification; and
a transfer request module at the network-based commerce system communicatively coupled to the communication module, the transfer request module to communicate the authentication data and identification to the network-based payment system.

8. The system as set forth in claim 7, wherein the transfer request module is to communicate transaction details associated with the transfer of value to the network-based payment system.

9. A method comprising:
receiving, at a network interface of a network-based payment computer in a network-based payment system, an identification of an entity from a network-based commerce system; and
receiving, at the network interface of the network-based payment computer, authentication data associated with the entity from the network-based commerce system,
the authentication data and the identification being usable by the network-based payment system to facilitate a transfer of value affecting a first account associated with the entity,
the transfer of value further affecting a second account associated with the network-based commerce system,
a combination of the authentication data and the identification including data identifying the first account, the data being-unrecognizable by the network-based commerce system to identify the first account,
the authentication data being associated with transfer limiting data selected for association with the authentication data, the transfer limiting data establishing a constraint on a type of the transfer of value; and
performing the transfer of value using the network-based payment computer.

10. The method as set forth in claim 9, the method further comprising:
receiving, from the network-based commerce system, transaction details associated with the transfer of value.

11. The method as set forth in claim 10, wherein the transaction details include an amount for the transfer of value.

12. The method as set forth in claim 9, wherein the authentication data is associated with a customer.

13. The method as set forth in claim 9, wherein the authentication data includes a personal identification number (PIN).

14. The method as set forth in claim 9, wherein the authentication data includes a password.

15. The method as set forth in claim 9, wherein the authentication data includes biometric data.

16. The method as set forth in claim 9, wherein the authentication data has is not been operable to facilitate the transfer of value prior to acceptance.

17. The method as set forth in claim 9, wherein the transfer limiting data includes at least one of a group consisting of merchant limitation data, country data, transaction context data, communication mode data, a maximum value for the transfer of value, a maximum aggregate value for at least one transfer of value occurring during a period of time, a maximum aggregate value for at least one transfer of value occurring during a day, a maximum aggregate value for at least one transfer of value occurring during a week, a maximum aggregate value for at least one transfer of value occurring during a month, and a maximum aggregate value for at least one transfer of value occurring during a year.

18. The method as set forth in claim 9, wherein the authentication data includes the identification of the entity.

19. The method as set forth in claim 9, wherein the authentication data does not include the identification of the entity.

20. The method as set forth in claim 9, wherein the identification of the entity is associated with a customer.

21. The method as set forth in claim 9, wherein the identification of the entity is an email address.

22. The method as set forth in claim 9, wherein the identification of the entity is a telephone number.

23. The method as set forth in claim 9, wherein the identification of the entity is an internet telephony user identifier.

24. The method as set forth in claim 9, wherein the identification of the entity is a name.

25. The method as set forth in claim 9, wherein the transfer of value includes a payment benefiting the network-based commerce system.

26. The method as set forth in claim 9, the method further comprising:
communicating transaction information to the network-based commerce system, the transaction information being associated with the transfer of value.

27. The method as set forth in claim 26, wherein the transaction information includes at least one of a group consisting of a transaction result, a source of the transfer of value, a balance available for transfer from a source of the transfer of value, and an address.

28. The method as set forth in claim 9, said method further comprising:
accepting the authentication data and the identification of the entity from a requestor of the transfer of value; and
communicating the authentication data and the identification of the entity to a network-based payment system.

29. The method as set forth in claim 28, further comprising communicating transaction details associated with the transfer of value to the network-based payment system.

30. A tangible machine-readable medium comprising a plurality of instruction sets, the plurality of instruction sets comprising:
a first instruction set to cause a machine to receive, from a network-based commerce system, an identification of an entity; and a second instruction set to cause the machine to receive, from a network-based commerce system, authentication data associated with the entity,
  the authentication data and the identification being usable by the machine to facilitate a transfer of value affecting a first account associated with the entity,
  the transfer of value further affecting a second account associated with the network-based commerce system,
  a combination of the authentication data and the identification including data identifying the first account, the data being-unrecognizable by the network-based commerce system to identify the first account,
  the authentication data being associated with transfer limiting data selected for association with the authentication data, the transfer limiting data establishing a constraint on a type of the transfer of value.

31. The tangible machine-readable medium of claim 30, wherein the plurality of instruction sets further comprises a third instruction set to cause the machine to receive, from the network-based payment system, transaction details associated with the transfer of value.

32. A system comprising:
a computer in a network-based payment system;
means for receiving in said computer, from a network-based commerce system, an identification of an entity and authentication data associated with the entity,
  the authentication data and the identification being usable by the network-based payment system to facilitate a transfer of value affecting a first account associated with the entity, the transfer of value further affecting a second account associated with the network-based commerce system,
  a combination of the authentication data and the identification including data identifying the first account, the data being-unrecognizable by the network-based commerce system to identify the first account,
  the authentication data being associated with transfer limiting data selected for association with the authentication data, the transfer limiting data establishing a constraint on a type of the transfer of value; and
means for performing the transfer of value.

33. The system as set forth in claim 32, said system further comprising:
means for accepting the authentication data and the identification of the entity from a requestor of the transfer of value; and
means for communicating the authentication data and the identification of the entity to a network-based payment system.

* * * * *

UNITED STATES PATENT AND TRADEMARK OFFICE
CERTIFICATE OF CORRECTION

| | |
|---|---|
| PATENT NO. | : 8,738,517 B2 |
| APPLICATION NO. | : 11/618700 |
| DATED | : May 27, 2014 |
| INVENTOR(S) | : Bedier et al. |

It is certified that error appears in the above-identified patent and that said Letters Patent is hereby corrected as shown below:

In the Claims
In column 14, line 10, in Claim 16, after "data", delete "has", therefor
In column 14, line 10, in Claim 16, delete "not", delete "been", therefor Signed and Sealed this
Ninth Day of December, 2014

Michelle K. Lee
*Deputy Director of the United States Patent and Trademark Office*